(12) United States Patent
Daily et al.

(10) Patent No.: US 11,401,993 B1
(45) Date of Patent: Aug. 2, 2022

(54) SHOCK MITIGATION UTILIZING QUIESCENT CAVITATION

(71) Applicant: The United States of America as represented by the Secretary of the Navy, Newport, RI (US)

(72) Inventors: David J Daily, Middletown, RI (US); Sarah E McQueen, Vancouver, WA (US)

(73) Assignee: The United States of America as represented by the Secretary of the Navy

(*) Notice: Subject to any disclaimer, the term of this patent is extended or adjusted under 35 U.S.C. 154(b) by 62 days.

(21) Appl. No.: 17/023,423

(22) Filed: Sep. 17, 2020

(51) Int. Cl.
*F16F 9/06* (2006.01)
*F16F 7/10* (2006.01)
*F16F 9/08* (2006.01)
*A42B 3/06* (2006.01)

(52) U.S. Cl.
CPC .............. *F16F 9/08* (2013.01); *A42B 3/06* (2013.01); *F16F 7/1017* (2013.01); *F16F 7/1034* (2013.01)

(58) Field of Classification Search
CPC ........ F16F 7/1017; F16F 7/1034; F16F 7/112; F16F 9/06; F16F 9/061; F16F 9/08; F16F 9/081; A42B 3/06
USPC ................................................. 188/378, 379
See application file for complete search history.

(56) References Cited

U.S. PATENT DOCUMENTS

| | | | |
|---|---|---|---|
| 1,783,348 A * | 12/1930 | Taylor | B62D 7/22 188/276 |
| 1,867,708 A * | 7/1932 | Paton | B60R 19/285 293/104 |
| 2,584,100 A * | 1/1952 | Uecker | F16J 13/10 220/328 |
| 3,091,307 A * | 5/1963 | Tiedemann | B29C 48/913 188/378 |
| 5,873,438 A * | 2/1999 | Osterberg | F16F 7/116 188/379 |
| 8,820,496 B2 * | 9/2014 | Digernes | F16F 15/173 188/378 |
| 11,098,784 B1 * | 8/2021 | Daily | F16F 9/5126 |
| 2018/0162188 A1 * | 6/2018 | Chikamatsu | F15B 1/24 |

FOREIGN PATENT DOCUMENTS

| | | | | |
|---|---|---|---|---|
| FR | 706556 A | * | 6/1931 | ......... F04B 39/0027 |
| GB | 771663 A | * | 4/1957 | ............ B60G 13/16 |

OTHER PUBLICATIONS

EPO translation, FR 706556 A. (Year: 1931).*

* cited by examiner

*Primary Examiner* — Thomas J Williams
(74) *Attorney, Agent, or Firm* — James M. Kasischke; Michael P. Stanley

(57) ABSTRACT

There is provided a device for mitigating physical shock to an object to which it is attached. The device includes a body having a through-bore extending from one end to another. A sliding mass is positioned within the bore hole such that it can slide within the through-bore. A first end cap is slidingly disposed in said body hollow volume at one end of the body, and a second end cap is slidingly disposed at the other. End cap and body combination is filled with a liquid. Responsive to an impact along the body axis, one of the end caps is partially displaced into the body and at least a portion of the liquid changes phase from a liquid phase to a vapor phase.

9 Claims, 7 Drawing Sheets

SHOCK MITIGATION UTILIZING QUIESCENT CAVITATION

STATEMENT OF GOVERNMENT INTEREST

The invention described herein may be manufactured and used by or for the government of the United States of America for governmental purposes without payment of any royalties thereon or therefor.

CROSS REFERENCE TO OTHER PATENT APPLICATIONS

None.

BACKGROUND OF THE INVENTION

(1) Field of the Invention

The present invention is directed to a device for mitigating physical shocks that utilizes quiescent cavitation to temporarily store impact energy and is further directed to a concussion mitigation apparatus employing the device.

(2) Description of the Prior Art

During a head impact, the brain suddenly moves back and forth inside the skull. The cerebrospinal fluid between the brain and the skull can cushion this action, but if the impact is strong enough, the brain will impact the inside of the skull potentially causing a concussion or other traumatic brain injury (TBI). TBI can occur when the skull is subjected to a sharp blow, bump, jolt, or penetrating brain injury that damages the brain. There is a wide spectrum of TBI ranging from "mild" (i.e., a brief change in metal status or consciousness) to "severe" (i.e., an extended period of unconsciousness or loss of memory after the injury). Typically, a mild TBI is referred to as a concussion. Survivors of TBI face complications and disabilities which may last from a few days to the rest of their lives. Effects can include impaired thinking or memory, movement, sensation (vision or hearing), or emotional functioning (e.g., personality changes, depression).

Injuries can occur from sudden acceleration or deceleration of the head and neck. A common traumatic brain injury is caused by what is called a "coup, contrecoup" impact. This injury occurs when the skull is suddenly decelerated, bringing the head forward. The brain impacts the frontal area of the skull in what is referred to as the "coup" injury. The skull then rebounds backwards until the neck stops the head and the brain impacts the back of the skull resulting in the "contrecoup" injury. The coup, contrecoup injury can be incurred by the head impacting a fixed object, but the injury can be sustained by the body suddenly decelerating and the head whipping back and forth.

Current solutions for avoiding TBI use padding in a helmet or other such device. A primary use of helmets is to shield the head from injuries caused by impact or sudden accelerations. It is well known in the art of helmet design to provide various types of impact absorbing material between an outer surface of a helmet and a wearer's head. When the helmet is subjected to an impact the impact absorbing material collapses to absorb energy from the impact and to distribute the energy over a wider surface area, for a longer period of time. Existing helmets do not guard against accelerations that can cause injury, such as the "coup, contrecoup" impact.

Cavitation is the phase change of a liquid to its vapor state by lowering the pressure in the liquid below its vapor pressure. This commonly occurs on the low pressure side of propellers, pumps, and venturi nozzles and is predicted by the cavitation number as follows:

$$Ca = \frac{P_{local} - P_v}{1/2\rho V^2} \tag{1}$$

where $P_{local}$ is the local pressure, $P_v$ is the vapor pressure of the liquid which is needed to cause cavitation, $\rho$ is the density of the liquid, and V is the velocity. Cavitation becomes likely when the cavitation number C is below 1. When the cavitation number is above 1, cavitation is unlikely and the fluid remains as a liquid.

Cavitation can be caused in a liquid that is initially quiescent by using acceleration. FIG. 1 shows a system for illustrating cavitation produced in a column of fluid subject to a vertical impact acceleration. A cylinder 100 is sealed at its top 103 and bottom 106. The interior of the cylinder 100 is filled with a liquid 109 having a column height of h. The top region of the cylinder 100 is filled with a gas 112. Applied to the equation above, $P_{local}$ is the ambient pressure of the liquid 109, and $P_v$ is the vapor pressure of the liquid 109. As noted above, the vapor pressure is the pressure needed at the bottom 115 of the column h to cause cavitation. An acceleration can occur in the direction shown by arrow 118, which shows a velocity V downward. Upon subjecting cylinder 100 to such a sudden acceleration, the kinetic energy of the accelerated column of liquid 109 is converted into potential energy in the form of cavitation bubbles 121. This slows the acceleration until collapse of the cavitation bubbles 121.

A person's head can be thought of as an egg, with the person's skull being the hard outer shell of the egg and the person's brain being the inner yolk of the egg. Current helmet technology uses padding to protect against grizzly head injuries like fractured skulls but does little to stop the inner "yolk" from becoming scrambled because helmets protect the head by distributing a focused impact over a larger area and time. The deformation of the padding does dampen an impact to the head to a point, but the movement of the head can still cause the brain to impact into the interior wall of the skull, causing a concussion.

In fact, it may be detrimental to wear a helmet by making the head heavier and generating additional stresses in the neck during a violent event such as a car crash (neck braces and the Hans device for racecar drivers as examples of the significance of this problem). Helmets do little to protect against TBI in cases of sudden acceleration or deceleration when the head is not struck.

There remains a need for a means for delaying and dissipating physical shocks in order to prevent certain concussions.

SUMMARY OF THE INVENTION

A first object is delaying and dissipating physical shocks caused by sudden acceleration or deceleration.

A second object is providing a lightweight shock control device that does not add to acceleration or deceleration induced forces on an attached body.

According to an aspect of the invention, a device for mitigating physical shock to an attached object is provided. The device includes a body having a through-bore extending from one end to another. A sliding mass is positioned within the bore hole such that it can slide within the through-bore. A first end cap is slidingly disposed in said body hollow volume at one end of the body, and a second end cap is slidingly disposed at the other. The end cap and body combination is filled with a liquid. Responsive to an impact along the body axis, one of the end caps is partially displaced into the body and at least a portion of the liquid changes phase from a liquid phase to a vapor phase.

In further embodiments, the device includes a plurality of longitudinal ridges located on an interior surface of the body. Each ridge of the plurality of longitudinal ridges extends from the first end to the second end of the body. A plurality of stopper ridges is centrally located on the interior surface of the body. Each ridge of the plurality of stopper ridges is displaced from the first end and the second end of the body. The sliding mass is slidingly engaged with the plurality of longitudinal ridges and the plurality of stopper ridges. A first end cap is slidingly disposed on the plurality of longitudinal ridges at the first end of the body. A second end cap is slidingly disposed on the plurality of longitudinal ridges at the second end of the body.

DETAILED DESCRIPTION OF INVENTION

Figure 1:
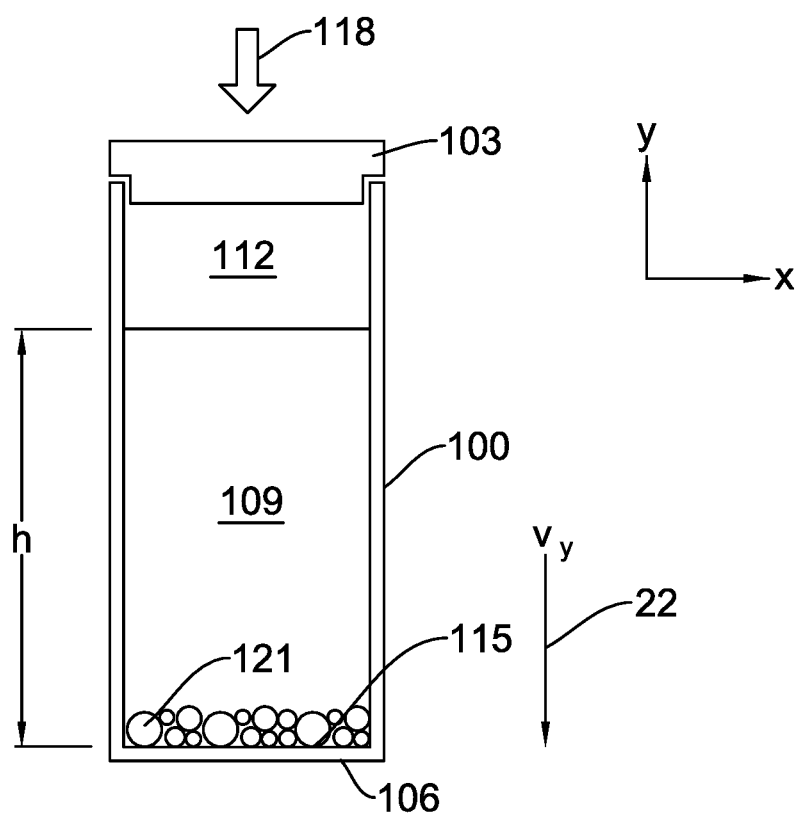
FIG. 1 is a diagram illustrating cavitation produced in a column of fluid subject to a vertical impact acceleration.

In order to use the energy capacity of potential energy stored in cavitation bubbles, it is desirable to characterize the onset of cavitation caused by acceleration. The Navier-Stokes equation is a partial differential equation used in fluid mechanics to describe the flow of incompressible fluids. This equation can be used in the y direction (downward) with continuity equations to describe the system shown in FIG. 1:

$$\rho\left(\frac{\partial u_y}{\partial t} + u_x\frac{\partial u_y}{\partial x} + u_y\frac{\partial u_y}{\partial y} + u_z\frac{\partial u_y}{\partial z}\right) = \quad (2)$$

$$-\frac{\partial P}{\partial y} + \mu\left(\frac{\partial^2 u_y}{\partial x^2} + \frac{\partial^2 u_y}{\partial y^2} + \frac{\partial^2 u_y}{\partial w^2}\right) + \rho g_y$$

$$\frac{\partial u_x}{\partial x} + \frac{\partial u_y}{\partial y} + \frac{\partial u_Z}{\partial z} = 0. \quad (3)$$

In these equations, u is a velocity vector, μ is viscosity ρ is the liquid density, and $g_y$ is gravity. Assuming that the fluid is inviscid, (i.e., having no or negligible viscosity), that all the fluid flow is in the vertical direction, and that surface tension effects are negligible:

$$\mu = 0, u_x = 0, u_z = 0, \therefore \frac{\partial u_y}{\partial y} = 0. \quad (4)$$

Applying these assumptions to the Navier-Stokes equation yields the following simplified equation.

$$-\rho\frac{\partial u_y}{\partial t} = -\frac{\partial P}{\partial y} + \rho g_y. \quad (5)$$

Defining $$\frac{\partial u_y}{\partial t} = a,$$

ignoring gravity, and using a finite difference to simplify the remaining terms, yields a cavitation number for acceleration:

$$C_a = \frac{P_{surface} - P_v}{\rho h a} \quad (6)$$

This number ($C_a$) can be used with the knowledge that values below 1 indicate accelerations that are likely to cause cavitation bubbles.

Equation 6 describes the relationship between the depth, acceleration, pressure difference, and the onset of cavitation. It was discovered that the column would initially accelerate after impact, but as the bubbles grew in size, the column would slow to a stop as the cavitation bubbles reached their maximum size before the cavitation bubbles collapsed. This observation indicates that the kinetic energy of the accelerating liquid column is temporarily (~10 milliseconds) converted into potential energy in the form of cavitation bubbles. Therefore, quiescent cavitation can be used to slow down an object subjected to a sudden impact.

Quiescent cavitation is dependent on the pressure inside the tube, the length of the tube, and the vapor pressure of the liquid being used. These three variables can be altered to make the liquid in the cavitation tube cavitate at lower or higher accelerations. This is important because the tube can be set to cavitate at lower accelerations for helmets having different purposes and users.

Figure 2:
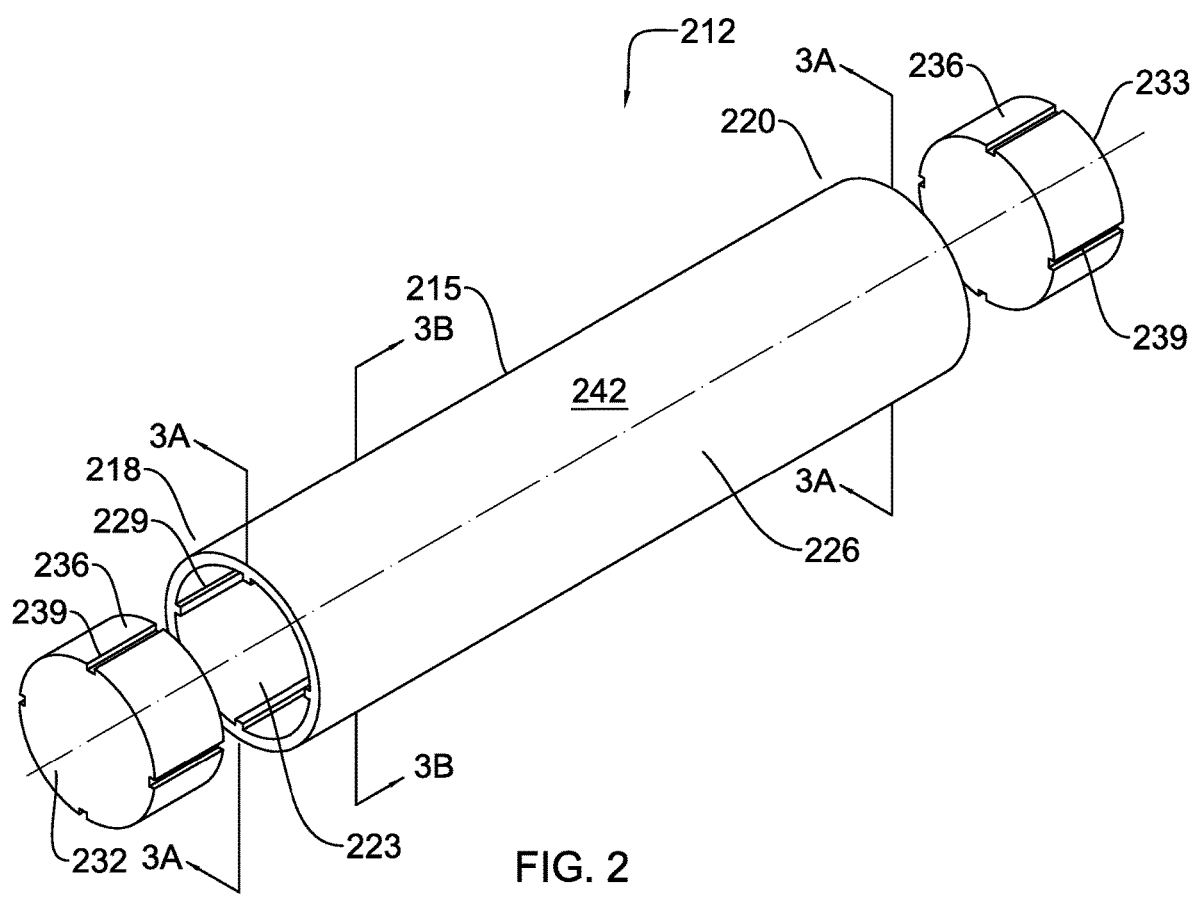
FIG. 2 shows a shock mitigating device according to devices and methods herein.
Figure 3A:
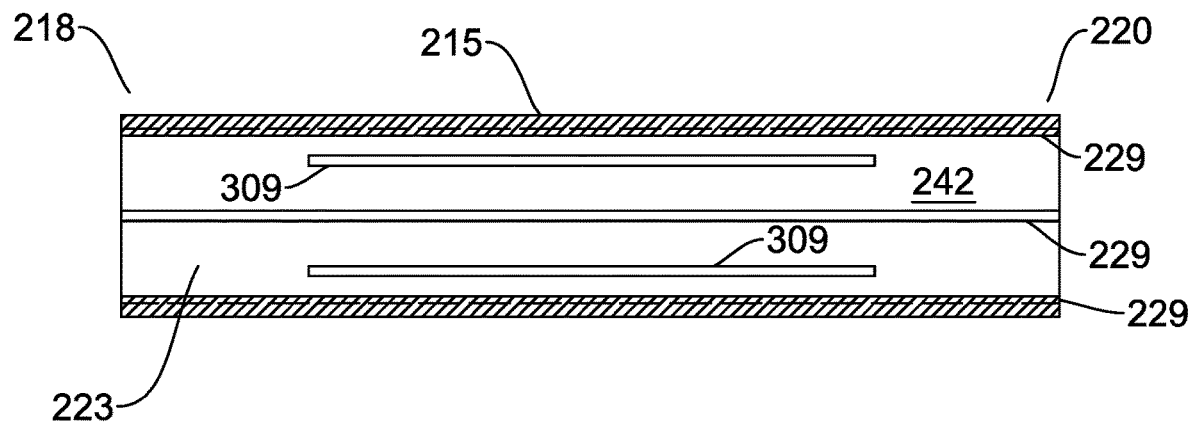
FIG. 3A is a cross-section view of the shock mitigating device of FIG. 2 taken along plane 3A-3A.
Figure 3B:
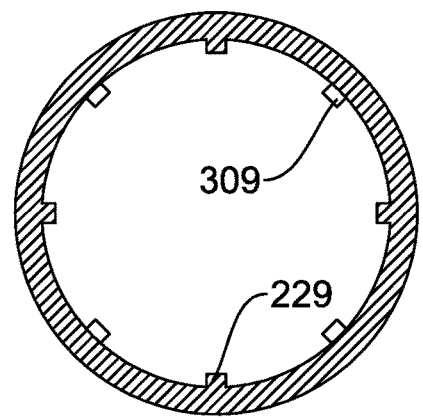
FIG. 3B is a cross-sectional view of the shock mitigating device of FIG. 2 taken along plane 3B-3B.

With knowledge of the acceleration cavitation number, Ca, a cavitation tube can be used to convert kinetic energy into potential energy in the form of cavitation bubbles. FIG. 2 illustrates an embodiment of a cavitation tube, indicated generally as 212, according to devices and methods herein. FIG. 3A and FIG. 3B are cross-sectional views of FIG. 2 taken along section planes 3A-3A and 3B-3B, respectively.

Cavitation tube 212 comprises a tube body 215 having a first end 218 and a second end 220. The tube body 215 is a hollow cylinder having an interior surface 223 and an exterior surface 226 with longitudinal ridges 229 on the interior surface 223 of the tube body 215. The longitudinal ridges 229 extend the entire length of the tube body 215 from the first end 218 to the second end 220, as shown in FIG. 3A. The tube body 215 is sealed on each end by end caps 232, 233. The end caps 232, 233 are sized and configured to fit within the tube body 215, at the first end 218 and the second end 220, respectively. The end caps 232, 233 have a cylindrical outer surface 236 containing keyed grooves 239 corresponding to the longitudinal ridges 229 on the interior surface 223 of the tube body 215. The end caps 232, 233 are dimensioned to slide longitudinally along the longitudinal ridges 229 within the tube body 215. Referring to FIGS. 3A and 3B, stopper ridges 309 are provided in a central portion of the tube body 215 to limit the longitudinal sliding of the end caps 232, 233. The stopper ridges 309 are on the interior surface 223 of the tube body 215 and do not extend the entire length of the tube body 215, as shown in FIG. 3A.

Figure 4:
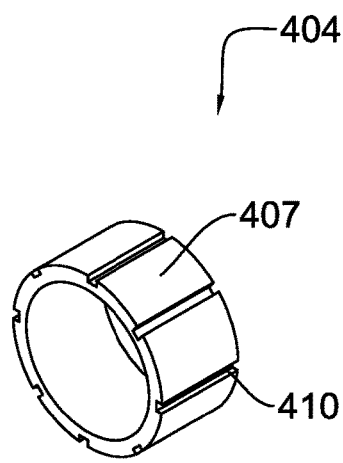
FIG. 4 shows a perspective view of a sliding mass for use with the shock mitigating device of FIG. 2.

Cavitation tube 212 can include a sliding mass, such as 404 shown in FIG. 4. The sliding mass 404 is sized and configured to fit inside the tube body 215 and may be shaped like a hollow cylinder. The exterior surface 407 of the sliding mass 404 has notches 410 corresponding to both the longitudinal ridges 229 and the stopper ridges 309 on the interior surface 223 of the tube body 215. The sliding mass 404 may be located within the tube body 215 and is dimensioned to slide within tube body 215 along the longitudinal ridges 229 and the stopper ridges 309 on the interior surface 223 of the tube body 215. Sliding mass 404 translation is limited by contact with end caps 232, 233. The sliding mass 404 is preferably made from a dense material such as tungsten (W), osmium (Os) or the like.

A liquid 242 is located within the interior of tube body 215 and retained by the end caps 232, 233. For cavitation purposes, an inertial mass consists of the sliding mass 404 along with the liquid 242, which touches both of the end caps 232, 233. That is, the end caps 232, 233 abut the liquid 242 and potentially the sliding mass 404 on either side of tube body 215. The liquid 242 can be any liquid having an appropriate vapor pressure ($P_v$) and density $\rho$ for cavitating when subjected to an expected acceleration at ambient temperatures and pressures for the environment of the cavitation tube 212. Degassed water may be suitable; however, other liquids such as corn syrup, ethanol, mineral oil, or mixtures thereof also can be utilized.

The end caps 232, 233 are inserted into the tube body 215 such that they abut the inertial mass on both sides with the sliding mass 404 in approximately the center of the tube body 215. According to devices and methods herein, in this design the end caps 232, 233 are capable of translating along a portion of the tube body 215 with as little friction as possible while still being water tight. Any leakage from the tube body 215, or past end caps 232 and 233, could compromise the performance of the cavitation tube 212.

Figure 5:
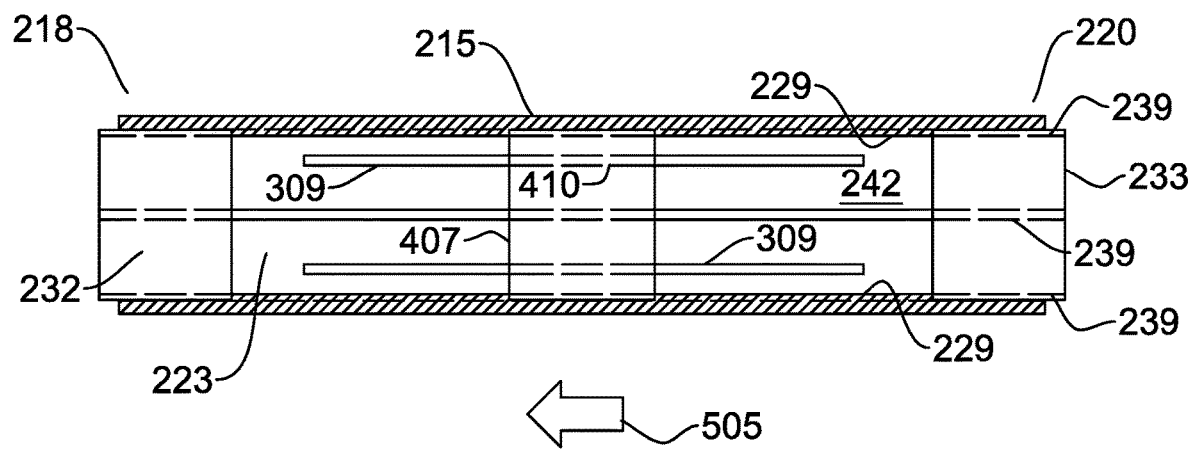
FIG. 5 shows a diagram of the shock mitigating device of FIG. 2 when subjected to a physical impact according to devices and methods herein.
Figure 6:
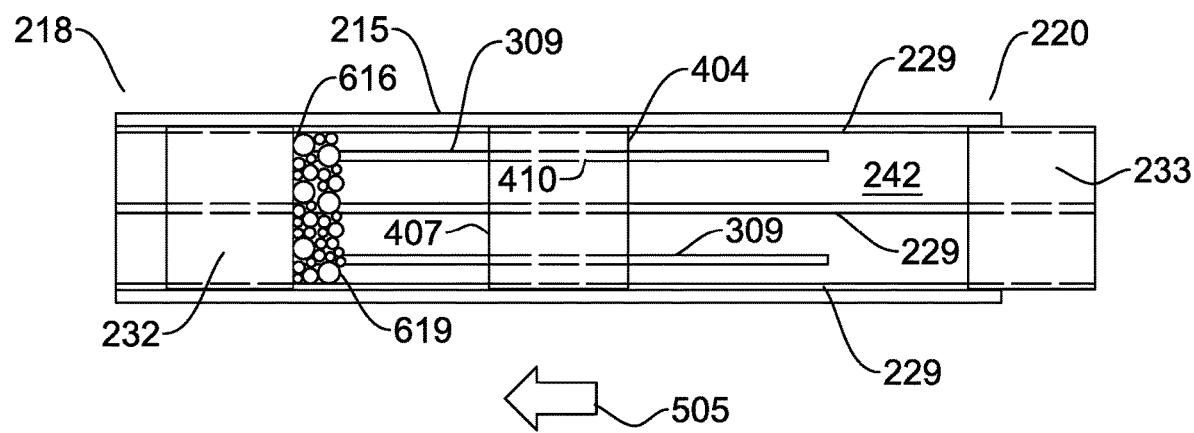
FIG. 6 shows another diagram of the shock mitigating device of FIG. 5 with internal cavitation according to devices and methods herein.
Figure 7:
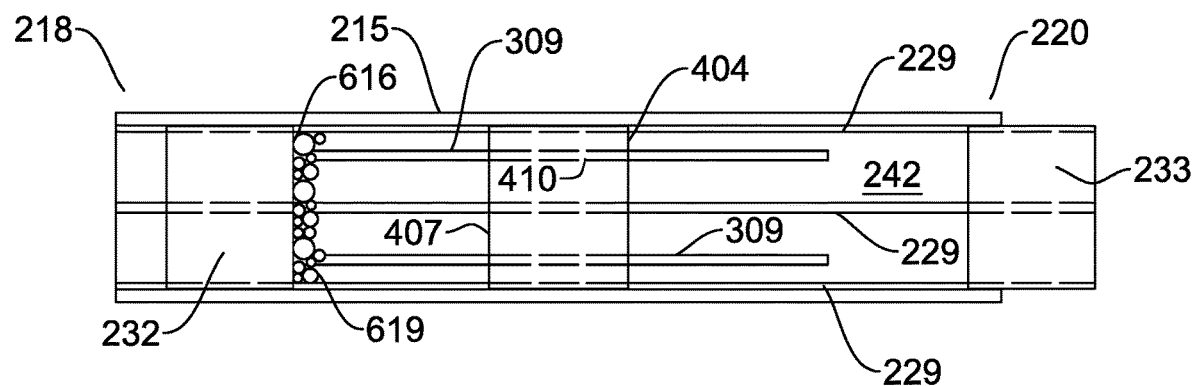
FIG. 7 shows the shock mitigating device of FIG. 5 after being subjected to a physical impact according to devices and methods herein.

Referring now to FIGS. 5-7, when the cavitation tube 212 is subjected to an acceleration impulse in the direction shown by arrow 505, inertia initially acts to hold the end caps 232, 233 and the sliding mass 404 in place. Then, as shown in FIG. 6, the tube body 215 translates a sufficient distance in the direction shown by arrow 505 such that the end cap 232 moves into the tube body 215 along the longitudinal ridges 229 until end cap 232 contacts the stopper ridges 309, which prevent the end cap 232 from further movement into the tube body 215. End cap 233, sliding mass 404, and the liquid 242 inside the cavitation tube 212 continue to move relative to the tube body 215 and end cap 232. This results in a pressure drop between the liquid 242 and an interior facing surface 616 of end cap 233, which causes cavitation bubbles 619 in the liquid 242 in the region where the liquid 242 is in contact with the surface 616 of end cap 232. Cavitation does not occur until the surface 616 of end cap 232 stops moving relative to the tube body 215. The sliding mass 404 and end cap 233 can continue to move relative to the tube body 215. Cavitation does not occur on the surface of the sliding mass 404 proximate to end cap 233 because the sliding mass 404 is moving; therefore, there is no pressure drop to cause cavitation.

As shown in FIG. 7, once the acceleration impulse stops, the cavitation bubbles 619 that formed adjacent to end cap 233 begin to collapse. End cap 232, sliding mass 404, and the liquid 242 inside the cavitation tube 212 can return to their initial position. The net result is that the cavitation and return act to spread out the acceleration impulse thereby shielding an object attached to the cavitation tube from some effects of the acceleration impulse.

The longitudinal ridges 229 and keyed grooves 239 of the end caps 232, 233 as shown in the figures are merely examples of how a cavitation tube 212 could be created. By contrast, the end caps 232, 233 could include tabs or other structural features that restrict the end caps 232, 233 from moving into the center section of the tube body 215. Moreover, if such a cavitation tube 212 were installed into a sports helmet, the tube body 215 could be flexible to allow the entire assembly to deform during a direct impact without breaking.

Figure 8:
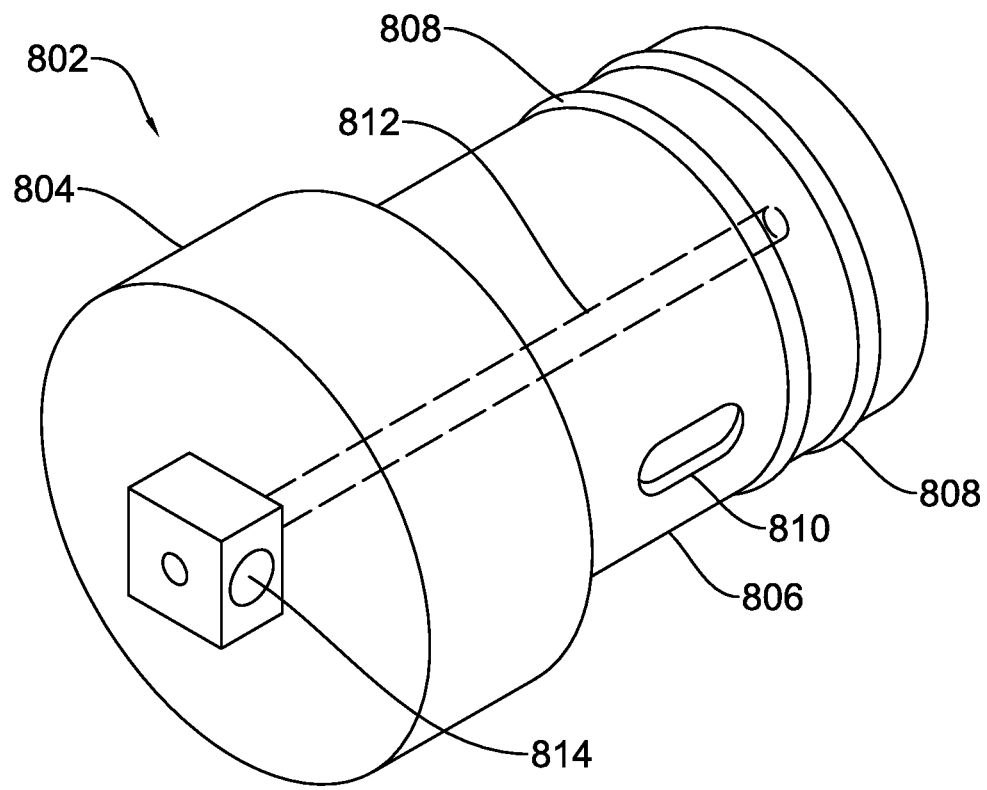
FIG. 8 shows a perspective view of an end cap according to an alternate embodiment.

FIG. 8 shows an end cap 802 according to an alternate embodiment. End cap 802 has a head 804 and a sliding body 806. Seals 808 are provided on the exterior of sliding body 806. These seals 808 can be any of a number of well-known sealing means capable of providing a sliding seal. These include seals such as a piston ring arrangement, an o-ring seated in a seal groove or another sliding seal known in the art. In a preferred embodiment at least two seals 808 are provided to give end cap 802 stability as it slides in tube body. A retaining groove 810 is formed in end cap 802 sliding body 806. Retaining groove 810 can interfere with a pin, set screw, or other protrusion on the interior surface of tube body. Retaining groove 810 can be a circumferential groove formed around sliding body 806. End caps 802 can be made from polycarbonate or another material. Density of the end caps 802 can be selected to influence cavitation.

This embodiment also features a bleed channel 812 providing a path for fluid communication between the interior of tube body and the exterior. Bleed channel 812 can be sealed with a plug 814. In this embodiment, plug 814 is inserted to block bleed channel 812 by extending orthogonally across bleed channel 812, but plug 814 could be inserted directly into bleed channel 812. Bleed channel 812 allows insertion of end cap 802 after filling of tube body with cavitation liquid. Gasses in cavitation liquid can also be bled through bleed channel 812 and sealed with plug 814.

Figure 9:
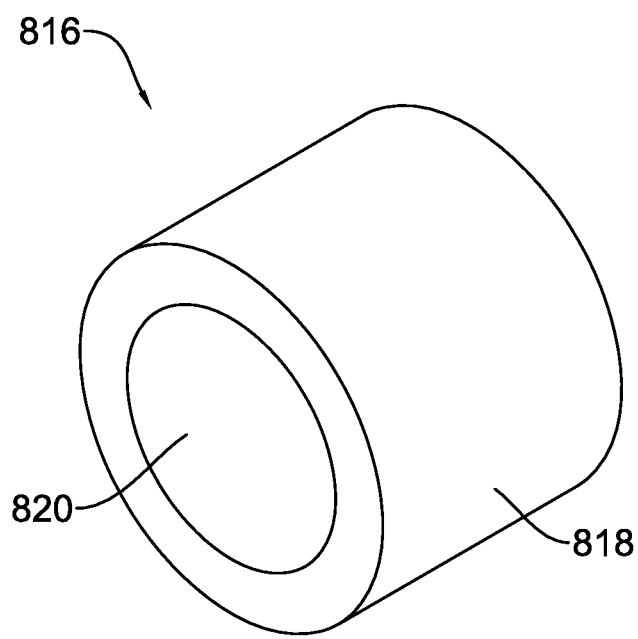
FIG. 9 shows a perspective view of a sliding mass according to an alternate embodiment.

FIG. 9 shows a perspective view of an alternate embodiment of sliding mass 816. Sliding mass 816 has a smooth exterior surface 818. An aperture 820 extending axially through sliding mass 816 allows fluid communication from one side of the sliding mass 816 to the other within tube body. As before, sliding mass 816 should be made from a dense, rigid material.

In the absence of longitudinal ridges and stopper ridges, the longitudinal thickness of sliding mass 816 and sliding bodies 806 must be calculated to prevent binding within the tube body. This calculation can be performed using the tolerance between the outer diameter of the sliding object and the inner diameter of the tube body. As established by practice, a minimum longitudinal thickness is the outer diameter of the sliding object.

Figure 10:
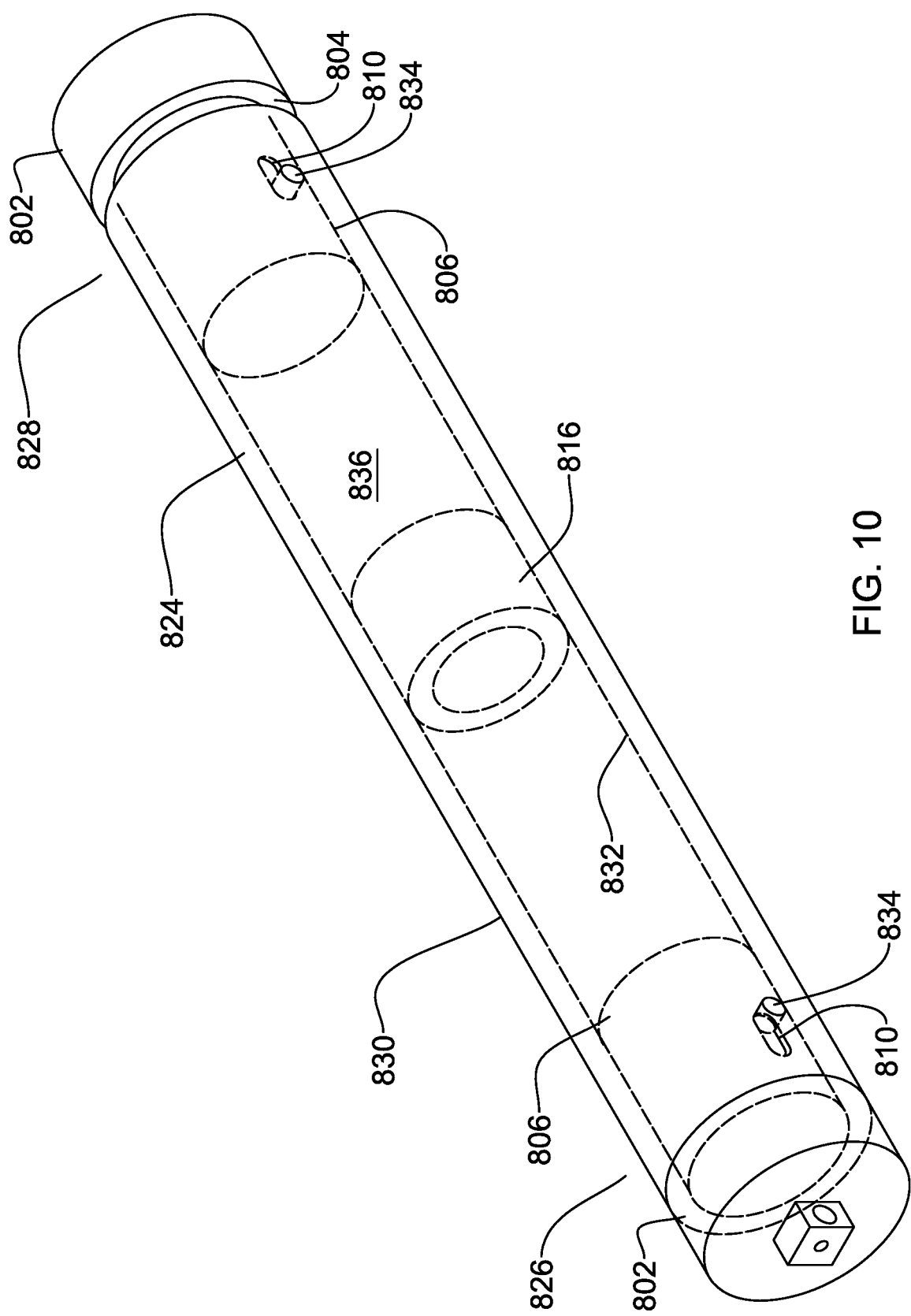
FIG. 10 shows a perspective view of the apparatus according to an alternate embodiment with hidden lines showing internal components.

FIG. 10 shows end cap 802 and sliding mass 816 positioned inside an alternate embodiment of tube body 824. Tube body 824 has a first end 826 and a second end 828. End cap 802 at first end 826 is fully inserted, and end cap 802 at second end 828 is positioned outward from body 824. Tube body 824 is a hollow cylinder having an exterior surface 830 and an interior surface 832. Interior surface 832 is smooth and does not have longitudinal ridges or stopper ridges as provided in the other embodiment. First end 826 and second end 828 are each sealed by an end cap 802 having sliding body 806 positioned in tube body 824 hollow interior. Seals 808 (not shown in FIG. 10) seal the surface of sliding body 806 against tube body 824. End caps 802 can slide within tube body 824. Head 804 is sized to interfere with tube body 824 in order to prevent end caps 802 from sliding fully within tube body 824. End caps 802 are further limited by interference with a limiting peg 834 that is fixed in tube body 824 and extends inward from interior surface 830. Limiting peg 834 is positioned to correspond with retaining groove 810 to limit longitudinal movement of each end cap 802. Limiting peg 834 can be a pin fixed in an aperture formed in tube body 824, a set screw fixed in the aperture, or any other protrusion.

Sliding mass 816 is positioned within tube body 824 between first end 826 and second end 828. Sliding mass 816 can slide within tube body 824 and is limited by the end caps 802. The hollow defined by interior surface 832 is filled with a cavitation fluid 836 as previously described with relation to the first embodiment.

The above described embodiments work on the principle of converting a portion of the kinetic energy due to an acceleration impact into potential energy in the form of cavitation bubbles. After approximately 2-5 ms, the bubbles collapse and convert the potential energy back into kinetic energy. Essentially, the cavitation tube temporarily stores a portion of the impact energy in order to release it later and distribute the energy over time.

It is also contemplated that cavitation tubes can be curved. This allows the cavitation tube to be contoured to the applied object. A l/radius dependency can be provided in the Navier Stokes equation using cylindrical coordinates:

$$\rho\left(\frac{\partial u_\phi}{\partial t} + u_r \frac{\partial u_r}{\partial r} + \frac{u_\phi}{r}\frac{\partial u_\phi}{\partial \phi} + u_z \frac{\partial u_\phi}{\partial z} + \frac{u_r u_\phi}{r}\right) = \qquad (7)$$
$$-\frac{1}{r}\frac{\partial p}{\partial \phi} + \mu\left(\frac{1}{r}\frac{\partial}{\partial r}\left(r\frac{\partial u_\phi}{\partial r}\right) + \frac{1}{r^2}\frac{\partial^2 u_\phi}{\partial \phi^2} + \frac{\partial^2 u_\phi}{\partial z^2} + \frac{2}{r^2}\frac{\partial^2 u_r}{\partial \phi} - \frac{u_\phi}{r^2}\right) + \rho g_\phi.$$

Assuming there is no velocity in the radial direction ($u_r = 0$), and that the radial velocity does not change as a function of radial angle $$\left(\frac{\partial u_\phi}{\partial \phi} = 0\right),$$

giving:

$$\rho\left(\frac{\partial u_\phi}{\partial t}\right) = -\frac{1}{r}\frac{\partial p}{\partial \phi}. \qquad (8)$$

Setting the derivative of radial velocity with respect to time equal to the radial acceleration, and simplifying the derivative of pressure with respect to change in angle utilizing the finite difference method yields:

$$1 = \frac{1}{pa_\phi r}\frac{\Delta P}{\Delta \phi}. \qquad (9)$$

It can be seen that this result is similar to the linear quiescent cavitation number with the exception of 1/r. The further the curved cavitation tube is from the center of rotation, the more movement the cavitation tube will undergo, increasing cavitation potential.

Cavitation tubes, such as those described herein, can be installed in a variety of different applications. One such application includes automotive applications to absorb impact energy during a collision. One or more cavitation tubes could be installed along the longitudinal access of the vehicle. During impact, the cavitation in the tube would temporarily, convert energy into cavitation bubbles before converting the energy back into kinetic energy. Cavitation tubes having a curved configuration can be used in order to guard against shocks to a helmet. The cavitation tubes can be arranged to maximize protection against ventral dorsal neck rotation. Multiple cavitation tubes can be installed for absorbing more energy during impact. Furthermore, with multiple cavitation tubes, the cavitation tubes could be tuned so that one cavitation tube would cavitate before another which help to protect the wearer from different levels of impact.

It will be understood that many additional changes in the details, materials, steps and arrangement of parts, which have been described and illustrated herein in order to explain the nature of the invention, may be made by those skilled in the art within the principle and scope of the invention as expressed in the appended claims. For example, hollow bodies can have a geometric configuration that causes an enhanced pressure drop at a chosen area resulting in cavitation at a lower acceleration.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present disclosure, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

Finally, any numerical parameters set forth in the specification and attached claims are approximations (for example, by using the term "about") that may vary depending upon the desired properties sought to be obtained by the present disclosure. At the very least, and not as an attempt to limit the application of the doctrine of equivalents to the scope of the claims, each numerical parameter should at least be construed in light of the number of significant digits and by applying ordinary rounding.

What is claimed is:

1. A device comprising:
a body having a first end and a second end, wherein said body has a through-bore extending from said first end to said second end, defining a hollow volume;
a sliding mass having an aperture formed longitudinally therethrough centrally located within said body, said sliding mass being capable of sliding within said body hollow volume;
a first end cap slidingly disposed in said body hollow volume at said first end of said body;
a second end cap slidingly disposed in said body hollow volume at said second end of said body; and
a liquid disposed in said hollow volume of said body and in said sliding mass aperture;
wherein, responsive to an impact along a longitudinal axis of said body, at least one of said first and second end caps is partially displaced into said body and momentum of said liquid and sliding mass causes at least a portion of said liquid to change phase from a liquid phase to a vapor phase; and
wherein:
said body has a plurality of longitudinal ridges on an interior surface of said body, each ridge of said plurality of longitudinal ridges extending from said first end to said second end of said body;
said body has a plurality of stopper ridges centrally located on the interior surface of said body, each ridge of said plurality of stopper ridges being displaced from said first end and said second end of said body;
said sliding mass has a plurality of grooves formed therein at a periphery of said sliding mass corresponding to said plurality of longitudinal ridges and said plurality of stopper ridges;
said first end cap has grooves formed around a periphery thereof corresponding to said plurality of longitudinal ridges, said first end cap being slidingly disposed in said body hollow volume on said plurality of longitudinal ridges at said first end of said body; and
said second end cap has grooves formed around a periphery thereof corresponding to said plurality of longitudinal ridges, slidingly disposed in said body hollow volume on said plurality of longitudinal ridges at said second end of said body.

2. The device of claim 1, wherein said plurality of stopper ridges limit displacement of said end cap into said body.

3. The device of claim 1, wherein said sliding mass is able to move within said body along said longitudinal ridges and said stopper ridges.

4. The device of claim 1, wherein:
said first end cap has a bleed channel formed therein providing communication from an interior defined by said body hollow volume, said first end cap, and said second end cap and an exterior of said body, said first end cap, and said second end cap; and
further comprising a plug positionable in said first end cap bleed channel to seal said first end cap bleed channel.

5. The device of claim 4, wherein:
said second end cap has a bleed channel formed therein providing communication from the interior defined by said body hollow volume, said first end cap, and said second end cap and an exterior of said body, said first end cap, and said second end cap; and
further comprising a second plug positionable in said second end cap bleed channel to seal said second end cap bleed channel.

6. A device comprising:
a body having a first end and a second end, wherein said body has a through-bore extending from said first end to said second end, defining a hollow volume;
a sliding mass having an aperture formed longitudinally therethrough centrally located within said body, said sliding mass being capable of sliding within said body hollow volume;
a first end cap slidingly disposed in said body hollow volume at said first end of said body;
a second end cap slidingly disposed in said body hollow volume at said second end of said body; and
a liquid disposed in said hollow volume of said body and in said sliding mass aperture;
wherein, responsive to an impact along a longitudinal axis of said body, at least one of said first and second end caps is partially displaced into said body and momentum of said liquid and sliding mass causes at least a portion of said liquid to change phase from a liquid phase to a vapor phase; and
wherein:
said first end cap has a first retaining groove formed on an outer surface of said first end cap;
said second end cap has a second retaining groove formed on an outer surface of said second end cap;
said body having a first protrusion extending inwardly into said body hollow volume and into said first end cap retaining groove to limit axial movement of said first end cap; and
said body having a second protrusion extending inwardly into said body hollow volume and into said second end cap retaining groove to limit axial movement of said second end cap.

7. The device of claim 6, wherein:
said body has a first aperture formed therein proximate to said body first end and a second aperture formed therein proximate to said body second end;
said first protrusion is a first set screw positioned in the body first aperture; and
said second protrusion is a second set screw positioned in the body second aperture.

8. A device comprising:
a body having a first end and a second end, wherein said body has a through-bore extending from said first end to said second end, defining a hollow volume;
a sliding mass having an aperture formed longitudinally therethrough centrally located within said body, said sliding mass being capable of sliding within said body hollow volume;
a first end cap slidingly disposed in said body hollow volume at said first end of said body;
a second end cap slidingly disposed in said body hollow volume at said second end of said body; and a liquid disposed in said hollow volume of said body and in said sliding mass aperture;

wherein, responsive to an impact along a longitudinal axis of said body, at least one of said first and second end caps is partially displaced into said body and momentum of said liquid and sliding mass causes at least a portion of said liquid to change phase from a liquid phase to a vapor phase; and wherein:

said first end cap has a bleed channel formed therein providing communication from an interior defined by said body hollow volume, said first end cap, and said second end cap and an exterior of said body, said first end cap, and said second end cap; and further comprising a plug positionable in said first end cap bleed channel to seal said first end cap bleed channel.

9. The device of claim 8, wherein:

said second end cap has a bleed channel formed therein providing communication from the interior defined by said body hollow volume, said first end cap, and said second end cap and an exterior of said body, said first end cap, and said second end cap; and further comprising a second plug positionable in said second end cap bleed channel to seal said second end cap bleed channel.

\* \* \* \* \*